United States Patent [19]

Gieseking

[11] Patent Number: 4,660,770

[45] Date of Patent: Apr. 28, 1987

[54] ELECTROMAGNETIC FUEL INJECTOR

[75] Inventor: John H. Gieseking, Detroit, Mich.

[73] Assignee: United Technologies Diesel Systems, Inc., Springfield, Mass.

[21] Appl. No.: 780,109

[22] Filed: Sep. 25, 1985

[51] Int. Cl.[4] .......................... B05B 1/30; F02M 61/20; F16K 31/02; F16F 1/06

[52] U.S. Cl. .......................... 239/585; 239/533.9; 251/129.16; 267/170

[58] Field of Search .......................... 239/585, 533.9; 251/129.14, 129.16, 129.21, 337; 267/170, 166

[56] References Cited

U.S. PATENT DOCUMENTS

| | | | |
|---|---|---|---|
| 1,960,709 | 5/1934 | Olenick | 251/337 |
| 4,354,640 | 10/1982 | Hans | 239/585 |
| 4,390,130 | 6/1983 | Linssen et al. | 239/585 |
| 4,394,973 | 7/1983 | Sauer et al. | 239/490 |
| 4,556,028 | 12/1985 | Wietschorke et al. | 251/129.21 |

*Primary Examiner*—Andres Kashnikow

*Assistant Examiner*—Patrick N. Burkhart

*Attorney, Agent, or Firm*—Stephen A. Schneeberger

[57] ABSTRACT

An electromagnetically-actuated fuel injector of the type having a spring-biased flat armature and a ball valve element is provided with an improved arrangement for preventing wobble or flutter of the armature, particularly during operation. The armature and ball valve are urged to the closed position by a helical coil spring coaxially aligned with and acting in compression against the armature. The end of the spring in engagement with the armature is modified or formed such that it includes a portion which is inclined axially from a plane normal to the axis of the armature so as to concentrate most of the axial spring force at the location where it engages the armature. As that location is to one side of the axis of the armature, the remote, or opposite, edge of the armature forms a pivot with a stationary part of the injector and reduces or eliminates armature wobble.

6 Claims, 4 Drawing Figures

FIG. 1A
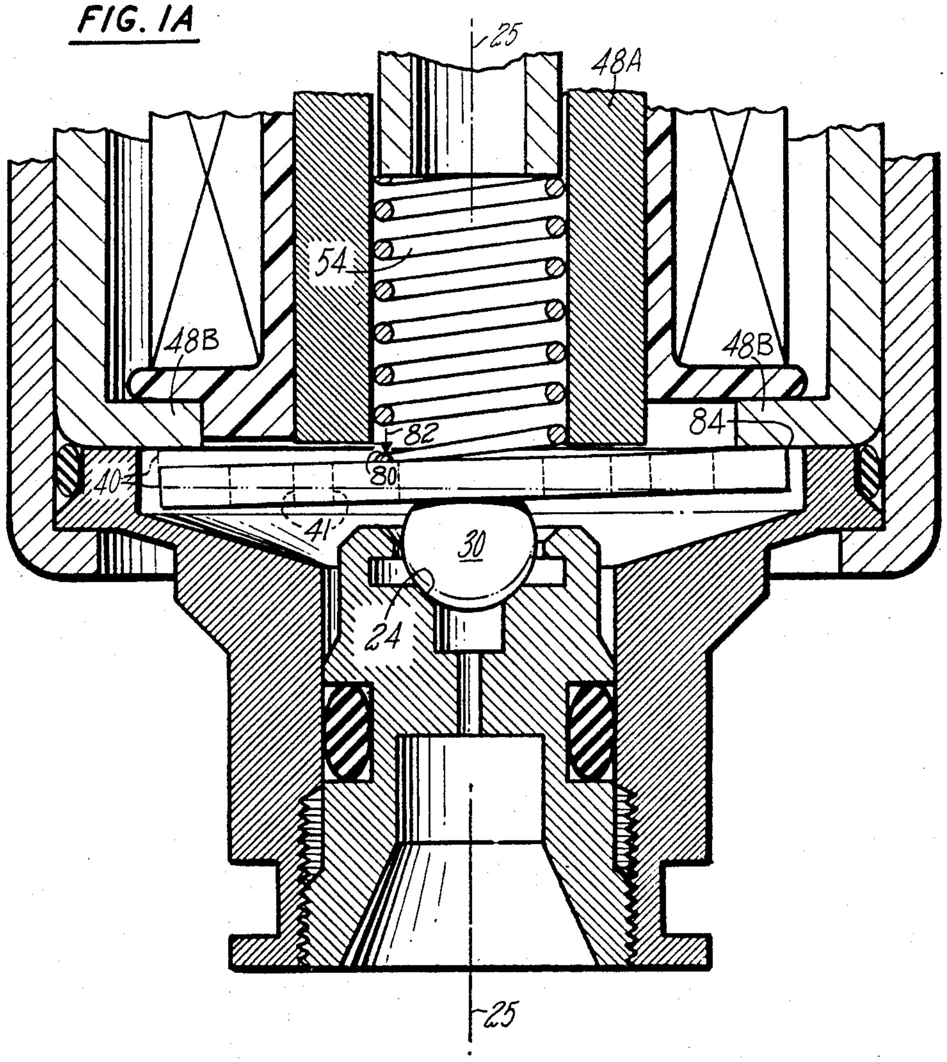
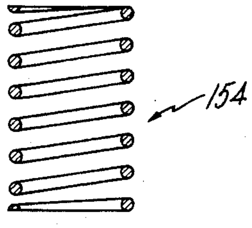
FIG. 2 PRIOR ART
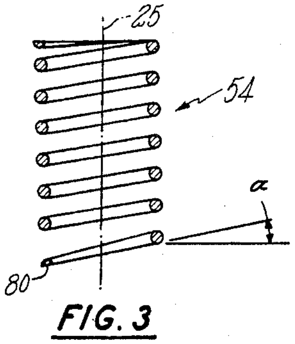
FIG. 3

ELECTROMAGNETIC FUEL INJECTOR

CROSS-REFERENCE TO RELATED PATENT APPLICATION

This application is related to the subject matter disclosed and claimed in U.S. Ser. No. 780,107 (UTC Docket No. AG-1058) for ELECTROMAGNETIC FUEL INJECTOR by M. Taxon and G. Maguran, filed on even date herewith and assigned to the same assignee.

DESCRIPTION

Technical Field

The invention relates to an electromagnetic fuel injector and more particularly to an injector of the type employing a relatively thin, or flat, armature for controlling the displacement of a valve element.

Background Art

In the prior art it has been known to employ flat, or flat-faced armature-pole piece arrangements in electromagnetic fuel injection valves. As used herein, the term "flat armature" is used to denote an armature-pole piece arrangement in which substantially all of the force of the magnetic attraction between the two is parallel to the axis of the valve. Further, such "flat armature" is typically much thinner in the axial direction than in the radial direction. It is also known for such injectors with flat armatures to also employ ball-type valves. Such injectors optimize the use of the magnetic forces and are of relatively low cost to manufacture. Examples of such injectors with flat armatures and ball-type valves are shown in U.S. Pat. Nos. 4,186,883; 4,354,640; 4,356,980; 4,390,130; and 4,474,332.

A possible disadvantage in the aforementioned type of flat-armature injector valve resides in the possible uncontrolled wobble or fluttering movements of the flat armature before, during and after actuation. Such fluttering movement may be random in its occurrence and/or in its positioning about the circumference of the normally-circular flat armature and thus, may adversely affect the dynamic fuel flow linearity and/or pulse-to-pulse repeatability of the fuel injector. On the other hand, many engine control strategies rely upon stability and repeatability of fuel injector operation.

The aforementioned U.S. Pat. Nos. 4,354,640 and 4,390,130 describe arrangements for controlling the motion of the flat armature during opening and closing of the valve so as to control or eliminate possible fluttering of the armature. In the aforementioned U.S. Pat. No. 4,354,640, the flat armature is supported on a first side so as to pivot about a tilt edge provided on that side and remote from the valve seat and is retained at the tilt edge on this side by the force of a spring which engages the other side of the flat armature oriented toward the valve seat. The unilateral retention of the flat armature at the tilt edge provides unequivocal upward and downward movement of the flat armature. An alternative to the foregoing arrangement is disclosed in U.S. Pat. No. 4,390,130 where the armature is pivotably supported on its side remote from the valve seat, or on the side oriented toward the valve seat, on a spring tongue which is preferably embodied out of a remnant air disc.

In each of those two arrangements, it is necessary to provide a secondary spring in addition to the normal primary spring which is coaxially positioned in the injector. That secondary spring might be provided by deforming a part of the remnant air disc if the injector is of a type which employs such disc, otherwise the installation of a separate spring is required.

DISCLOSURE OF INVENTION

It is an object of the present invention to provide an electromagnetic fuel injector having a flat armature and including an improved mechanism for controlling possible wobbling of the armature. Included within this object is the provision of such mechanism without requiring a secondary spring for controlling armature wobble.

Accordingly, there is provided an improved electromagnetic fuel injector for an internal combustion engine having a valve axis and including a housing, a flat armature connected to a movable valve element arranged to cooperate with a valve seat and a spring for exerting a force in an axial direction on the armature, and electromagnetic means for exerting a force in an opposite direction on the armature when electrically energized. The spring is a helical coil spring disposed in substantially coaxial alignment with the valve axis and having an end in compressive engagement with the armature. According to the improvement, the end of the coil spring in engagement with the armature is so formed as to apply a greater axial spring force to one side of the valve axis than the other, thereby to effect pivoting of the armature about a pivot, that pivot being determined by the location of the end of the coil spring. The required forming of the end of the coil spring may be obtained by bending the end of a normally squared-end spring such that it extends axially at an angle to a plane normal to the axis of the spring and the valve. That angle may be relatively small, i.e. 12°.

BRIEF DESCRIPTION OF THE DRAWINGS

FIG. 1A is an enlarged view of a portion of the injection valve of FIG. 1;

FIG. 2 is a return spring for an armature and valve in accordance with the prior art; and FIG. 3 is a return spring for an armature and valve in accordance with the present invention.

BEST MODE FOR CARRYING OUT THE INVENTION

Figure 1:
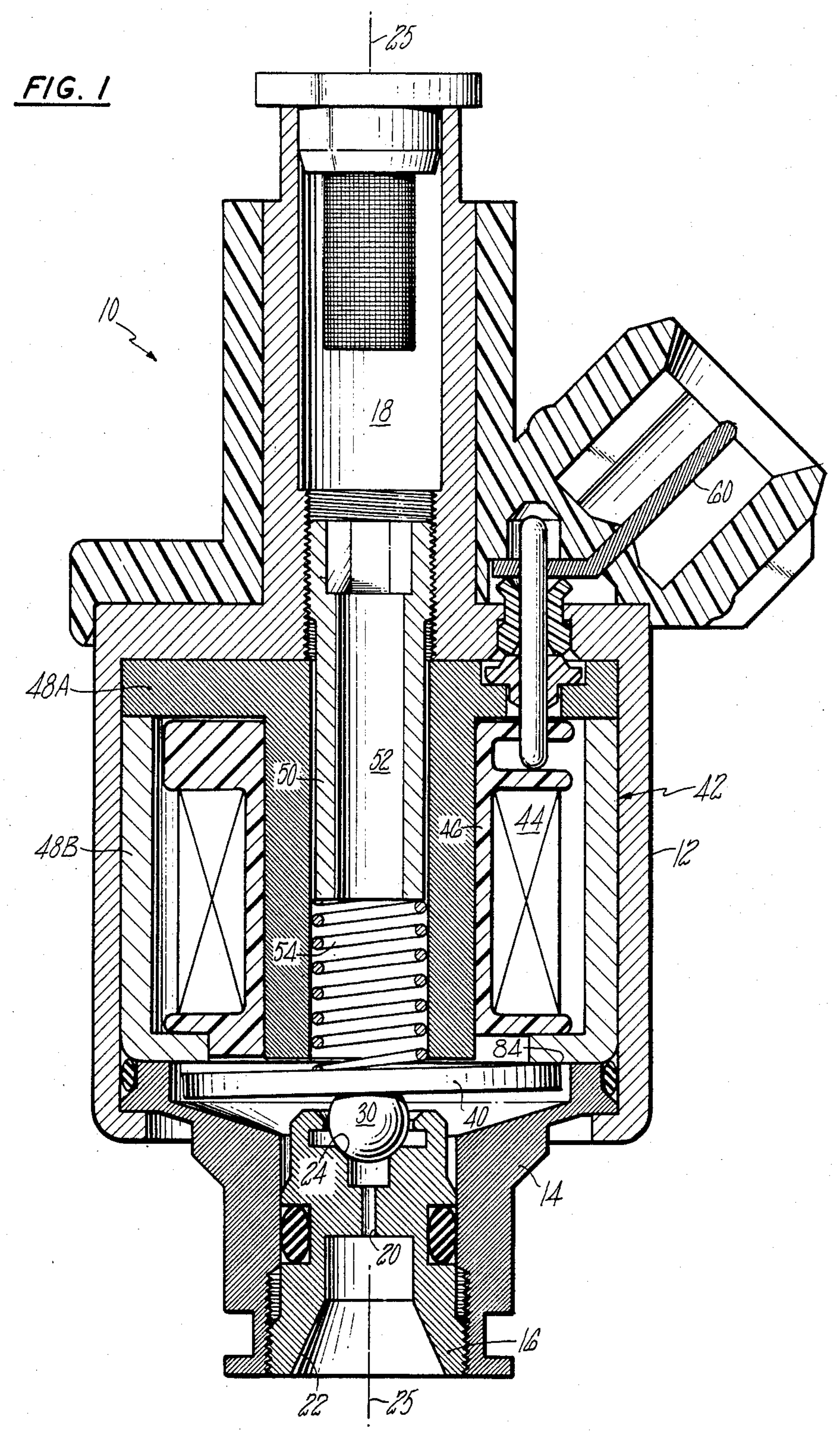
FIG. 1 is an axial, sectional view of a fuel injector in accordance with the present invention.

Referring to FIGS. 1 and 1A there is illustrated, in axial section, an electromagnetically-actuated fuel injector 10 in accordance with the invention. A generally-elongated tubular housing is provided by a tubular housing member 12 of nonmagnetic material, a valve container ring 14 and a valve body 16. The housing member 12 comprises the upper portion of the injector housing, with the lower remaining portion being formed by the valve container ring 14 and the valve body 16. The housing 12 is open at its upper end to provide a fuel inlet 18. The lower end of housing member 12 is deformed inwardly to provide an upwardly-facing flange, which engages a downwardly-facing shoulder on an annular rim of valve container ring 14 to axially retain the container ring. The valve body 16 may be mounted in a threaded bore in the valve container ring 14 and includes one or more passages or orifices 20 extending therethrough for metering fuel to be supplied to a discharge nozzle portion 22. A fixed valve seat 24 is formed toward the upper end of the valve body 16. The valve seat 24 may typically be provided by machining a truncated, conical surface in coaxial alignment with the axis 25 of the injector 10.

The movable valve element is a ball element 30 which is firmly connected as by welding, with a flat armature 40. The flat, washer-shaped armature 40 is formed of magnetic material and is generally circular, its diameter extending transversely of the axis 25 of injector 10, and its thickness in the axial direction being substantially less than its diameter. Armature 40 includes a plurality of openings 41 extending axially therethrough to facilitate displacement of the armature relative to the fuel and to provide a flow path for the fuel when the injector is energized.

The armature 40 is part of an electromagnetic motor or solenoid 42 which is concentrically housed within housing member 12. The solenoid 42 is entirely contained within the lower portion of housing 12 and includes a coil 44 coaxially disposed on a tubular nonmagnetic bobbin 46 which is in turn coaxially disposed between the radially inner and outer sections 48A and 48B, respectively of an annular magnetic frame 48. The inner section 48A of the magnetic frame 48 includes a cylindrical, fluid-passing bore extending therethrough. A spring adjuster 50 is threadedly inserted into the upper end of housing 12. The spring adjuster 50 includes a fluid-passing bore 52 extending coaxially therethrough. A helical spring 54 is positioned coaxially within the central bore of magnetic frame 48A in compressive engagement with the lower end of spring adjuster 52 and the upper surface of armature 40 to apply a downward, or closing, biasing force to the upper surface of armature 40 and thus also to the ball valve 30. Adjustment of the axial positioning of adjuster 52 is used to vary the biasing force applied by spring 54 to the ball valve 30.

Generally speaking, spring 54 acts against armature 40, and thus ball valve 30 to keep the valve of injector 10 normally closed. An electrical current applied to coil 44 via an electric plug connection 60 serves to develop a magnetic field which acts on armature 40 to move it axially upward toward and into engagement with the outer magnetic frame portion 48B. Typically, the armature 40 will engage the undersurface of outer magnetic frame 48B and be retained thereat so long as the current is maintained. In this position, the ball 30 is spaced from the seat 24 and fuel is permitted to flow through the injector 10, for metering at orifice 20 and subsequent discharge through nozzle 22. The inner magnetic frame 48A is somewhat shorter in the axial direction, i.e. by 0.002–0.005 inch, than the outer frame 48B to provide a nonmagnetic air gap which facilitates release of armature 40 when the coil 44 is de-energized.

Although not separately shown, the upper surface of armature 40 and the lower surface of magnetic frame 48B are provided with respective coatings which serve a dual function. The coatings on the armature 40 and the magnetic frame 48B may be nickel and chrome, respectively. The coating on frame 48B provides a nonmagnetic "air" gap which facilitates release of armature 40 when the coil 44 is de-energized and the combined coatings provide wear resistance for their less-resistant, low-carbon steel substrates.

Referring to FIG. 2, there is illustrated a spring 154 in accordance with the prior art. That spring includes a plurality of helical coils and is squared and ground in a conventional manner at its opposite ends. The squaring and grinding of the opposite ends serves to dispose the coil which forms each of the opposite ends in a plane which is substantially perpendicular to the axis of the spring and thus, also to the armature and the valve. In this way the spring force is evenly distributed throughout an annular region about that axis.

However, in accordance with the present invention, the spring 54 is formed such that it not only serves as a return spring for the armature 40 and ball 30, but it also serves to control armature wobble which might otherwise be present. The lowermost end 80 of spring 54 in FIGS. 1, 1A and 3 is formed such that it extends axially outward from a plane normal to the axis 25 by an angle $\alpha$. That angle need not be large, typically in the range of 10°–25°; however, it serves to focus the application of the spring force on armature 40 to a relatively small region or point which is radially offset from the axis 25. This effect is seen most clearly in FIG. 1A in which the arrow 82 indicates the general location of the spring force applied by spring end 80. Because that location is radially offset to the left of axis 25 as depicted in FIG. 1A, a pivot point 84 is created to the right where the diametrically-opposite extreme of the armature 40 contacts the undersurface of the magnetic frame 48B.

Referring to the operation of the injector 10 incorporating the present invention, with particular reference to FIG. 1A, the armature 40 will typically describe a uniform pivoting motion about the pivot 84 as the solenoid 42 is alternately energized and de-energized. The illustration in solid line represents the valve in its closed condition with the ball 30 against seat 24. The broken-line illustration represents the entirety of armature 40 having been pivoted upwardly about pivot 84 into engagement with the magnetic frame 48B, thereby lifting the ball 30 from the seat 24 to open the valve. This motion is obtained in a repeatable manner by the application of the spring force 82 by the spring end 80 such that the possibility of armature wobble is substantially eliminated. During operation of the injector 10, the edge of armature 40 at pivot 84 remains in contact with frame 48B due to the "cocking" force of the spring and the inertia of high-speed operation.

In the illustrated embodiment, the outside diameter of the spring 54 is 0.205 inch, such that the force 82 applied by spring end 80 is radially offset from axis 25 by about 0.1 inch. The spring 54 may have a spring rate of, for instance, 7 or 15 pounds per inch. The stroke of the ball valve element 30 is nominally 0.002 inch, such that the stroke of armature 40 at its leftmost end, as seen in FIG. 1A, is approximately twice that value.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. In an electromagnetic fuel injector for an internal combustion engine having a valve axis and including a housing, a flat armature connected to a movable valve element arranged to cooperate with a valve seat, spring means for exerting a force in an axial direction on said armature, and electromagnetic means for exerting a force in an opposite direction on said armature when electrically energized, the improvement comprising:

said spring means being a helical coil spring disposed in substantially coaxial alignment with the valve axis and having an end in compressive engagement with said armature, the final coil which includes said end of said coil spring being inclined axially outward at an angle relative to a plane normal to the axis of the spring so as to apply to said armature a greater axial spring force to one side of the valve axis than the other thereby to effect pivoting of said armature about a pivot, said pivot being determined by the location of said end of said coil spring.

2. The fuel injector of claim 1 wherein said angle is in the range of 10°–25°.

3. The fuel injector of claim 1 wherein said spring is initially of the type having both ends squared and in which an end has been subsequently bent outward to provide said end of said spring.

4. The fuel injector of claim 1 wherein said armature is substantially circular, said electromagnetic means includes a magnetic frame member having an annular portion in axial alignment with the outer circumference of said armature and said pivot is provided by an edge at the circumference of said armature in engagement with said frame member.

5. The fuel injector of claim 4 wherein said end of said spring engages said armature to one side of said valve axis to provide said greater spring force thereat and said pivot is located substantially diametrically opposite thereto.

6. The fuel injector of claim 5 wherein said valve element is a ball.

* * * * *